Dec. 28, 1965    J. E. HECKETHORN    3,225,870
SHOCK ABSORBER BAFFLE MEANS
Filed Oct. 21, 1963
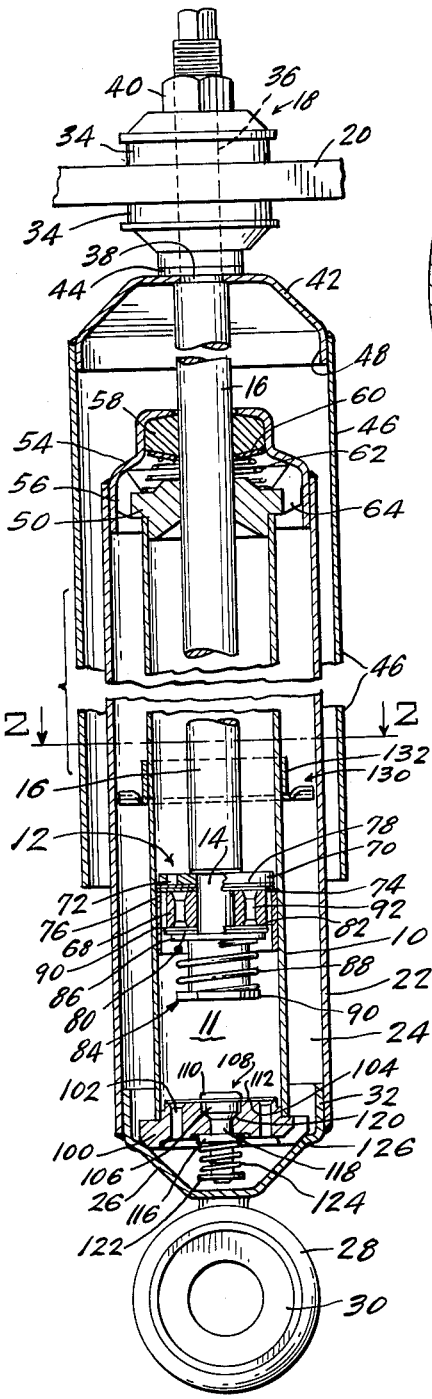
INVENTOR:
JOHN E. HECKETHORN.
BY
Harry O. Ernsberger
ATT'Y.

United States Patent Office 3,225,870
Patented Dec. 28, 1965

3,225,870
SHOCK ABSORBER BAFFLE MEANS
John E. Heckethorn, Dyersburg, Tenn., assignor to Oldberg Manufacturing Company, Grand Haven, Mich., a corporation of Michigan
Filed Oct. 21, 1963, Ser. No. 317,453
11 Claims. (Cl. 188—100)

This invention relates to hydraulic shock absorbers and more especially to hydraulic shock absorbers of the double tube, two-way direct-acting type particularly adapted for damping the relative movements of automobile bodies or chassis and wheel suspensions.

The invention more especially relates to hydraulic shock absorbers of the direct-acting type wherein a piston and piston valve arrangement are reciprocable in a working chamber or cylinder in combination with a liquid reserve chamber or reservoir surrounding the working chamber with a base valve construction between the working chamber and the reserve chamber, the piston rod being arranged to be connected with the vehicle frame and the working cylinder and reserve chamber assembly connected with the vehicle wheel supporting means for controlling the relative movements of these components.

In the operation of this type of shock absorber, transfer of liquid between the working chamber and the reserve chamber occurs at high velocities resulting from rapid relative movement between the cylinder assembly and piston rod, the transfer of liquid being effected through foot valve mechanism disposed between the working cylinder and the reserve chamber. The flow of the liquid into the reserve chamber upon the occurrence of a compression stroke and return flow into the working chamber or cylinder during the rebound stroke of the piston occurs at high frequencies and high velocities during vehicular travel on rough roads. Operation of the shock absorber under these conditions tends to promote aeration of the liquid producing emulsification and foaming. If the liquid such as oil becomes aerated, a compressible froth is carried into the working chamber on rebound strokes resulting in a momentary loss of damping control. Various types of baffle means have been employed in the reserve or reservoir chamber in endeavors to overcome the difficulties of foaming of the oil or liquid, and various means have been employed to reduce or minimize foaming in the reservoir chamber. Baffles in the form of coil springs or spiral ribbons, have been used for the purpose but have not effectively solved the problem.

The present invention embraces a shock absorber embodying a novel baffle means disposed in the reserve chamber fashioned or configurated to promote a swirling or generally horizontal circular motion of the liquid at the region of transfer from one side of the baffle means to the other which is effective to eliminate gushing or splashing and thereby prevent foaming of the liquid.

The invention embraces the provision of a baffle means of annular shape disposed in the liquid reserve chamber having louvered passages formed therein which facilitate movement or flow of liquid from one side of the baffle to the other without appreciable restriction yet preventing the liquid from moving through the baffle area in a manner to cause aeration and foaming.

Another object of the invention is the provision in a reserve chamber of a double tube shock absorber of a baffle means which permits easy entry or withdrawal of the liquid into and out of the reserve chamber and which is effective to prevent splashing or sudden displacement or cavitation of the liquid column in the reserve chamber whereby to hold the liquid column together as a unitary body even though the fluid is moving through the baffle area alternately in opposite directions at comparatively high velocities.

Another object of the invention is the provision of a baffle means in the liquid reserve chamber fashioned with passageways effective to accommodate rapid change in direction of flow of the liquid but which sets-up a checking or retardent action tending to hold the liquid column in an integrated body eliminating turbulence and thereby preventing it from breaking up or foaming.

Another object of the invention is the provision of a baffle means disposed in a liquid reserve chamber of a double-acting type shock absorber fashioned so as to effectively dissipate the jetting of liquid during transfer through the baffle means whereby cavitation in the liquid column is substantially eliminated with no appreciable disturbance on the surface of the liquid in the reserve chamber.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawing of a form of the invention, which may be preferred, in which:

FIGURE 1 is a longitudinal sectional view through a double tube shock absorber embodying a form of the baffle construction of the invention in the liquid reserve chamber;

FIGURE 2 is an enlarged transverse sectional view taken substantially on the line 2—2 of FIGURE 1;

FIGURE 3 is a side elevational view of the baffle construction illustrated in FIGURE 2, and FIGURE 4 is an enlarged fragmentary sectional view taken substantially on the line 4—4 of FIGURE 3.

Referring to the drawings in detail and initially to FIGURE 1, the shock absorber embodying the invention is inclusive of a tubular member or working cylinder 10 providing a working chamber 11 in which is slidably disposed a piston and piston valve construction or assembly 12 mounted on a tenon 14 provided at the lower end of a piston rod 16. The upper end of the piston rod is equipped with a mounting construction 18 adapted to be secured to a member or bracket 20 carried by or forming a part of the frame construction of a vehicle with which the shock absorber may be used.

The working cylinder 10 is surrounded by a second cylinder or tubular member 22 concentric with the working cylinder 10 and spaced therefrom to form a liquid reserve chamber or reservoir 24 of annular cross-section, the lower end of the cylinder 22 being provided with an end cap 26 forming a closure for this end of the cylinder 22. Welded to the end cap 26 is a lower mounting fitting 28 of annular construction accommodating a grommet or bushing 30 to accommodate a member (not shown) secured to the vehicle axle or other vehicle wheel supporting means of conventional construction.

The cap 26 is provided with a peripheral flange 32 welded throughout its periphery to the lower end of the reserve cylinder 22. The upper mounting 18 comprises two bushings 34 accommodating a mounting stud 36 welded to a tenon 38 on the piston rod 16, the bushings 34 adapted to engage opposing surfaces of the mounting bracket 20. A nut 40 is threaded on the stud 36 for securing the bushings 34 in engagement with the mounting bracket. Mounted on the tenon 38 is an upper cap 42 fixedly secured between a head 44 of the stud 36 and the shoulder of the piston rod 16.

Surrounding the cylinder 22 is a third cylindrical member or sleeve 46 welded to a flange 48 formed on the cap 42, the cylinder or sleeve 46 being open at its lower end and providing a guard to prevent damage to the piston rod by flying stones or debris. The upper ends of the cylinders 10 and 22 are closed to confine the fluid within the working chamber 11 and the reserve chamber 24. Disposed in the upper end of the working cylinder 10 is a bushing 50 snugly fitting yet slidably accommodating the piston rod 16, the bushing being pressed into the cylinder 10.

Disposed in the upper end of the outer cylinder 22 is a cap 54 engaging the bushing 50 and having a flange 56 welded to the cylinder 22. Contained in the cap member 54 is a packing gland or sealing member 58 snugly engaging the surface of the piston rod 16 to prevent leakage of fluid along the rod.

A washer 60 abuts the sealing member 58 and an expansive coil spring 62, positioned between the bushing 50 and the washer 60 compresses the material of the seal or sealing member 58 to assure intimate sealing engagement with the rod 16.

The bushing 50 is formed with peripherally spaced notches 64 providing drain channels facilitating the return of fluid which may seep along the rod 16 through the bushing 50 into the reserve chamber or reservoir 24. Through this arrangement there is minimum loss of fluid from the working and reserve chambers.

The piston and piston valve assembly 12 include a piston body 68. Also mounted on the tenon 14 and abutting the shoulder at the base of the tenon is an abutment plate 70, the latter being provided with circumferentially spaced openings 72. Disposed adjacent the upper surface of the piston is a disc-like inlet valve 74. The peripheral region of the disc valve 74 engages a circular seat 76 formed on the piston body. The valve 74 is biased toward the valve seat or closed position by a star shaped spring plate 78 backed by the abutment plate 70.

The abutment plate 70 is fashioned with an annular recess (not shown) providing clearance space for the fingers or projections of the star shaped plate spring 78. The fingers of the plate spring 78 are flexed when fluid pressure developed beneath the piston moves the disc valve 74 from its seat to admit flow of fluid into the rod region above the piston.

The piston assembly includes a rebound valve arrangement for facilitating the flow of fluid from the rod end region of the working cylinder to the region beneath the piston.

A rebound disc valve 80 is disposed beneath the lower surface of the piston body 68. A metering disc 82 is disposed between the piston body and the disc valve 80, the peripheral region of the metering disc 82 seating against a circular ridge formed on the lower surface of the piston body. The lower portion of the tenon 14 on the piston rod is threaded to receive a nut 84, and surrounding the upper portion of the nut is an annular member 86 forming a spring retainer or abutment for an expansive coil spring 88, which seats upon a flange 90 formed on the nut 84.

A flange (not shown) formed on the annular member 86 engages the rebound valve disc 80, the pressure of the spring 88 normally holding the rebound valve 80 in closed position. The metering disc or valve 82 is fashioned with one or more notches or passages depending upon the size of permanent bleed passage means desired to permit flow of liquid from one side to the other. The function of permanent bleed passage means in the metering disc 82 is to offer a fixed resistance to minor relative movements between the piston and the working cylinder such as may be caused by slight road irregularities.

The piston body 68 is provided with a plurality of circumferentially arranged spaced passages or channels 90 controlled by the valve 74, and a second set of passages 92 controlled by the valve 80.

The shock absorber is provided with a base or foot valve construction which is inclusive of a valve plate or body 100 provided with a plurality of circumferentially spaced openings 102 preferably six in number, the size and number of openings being sufficient to accommodate passage of substantial volume of fluid on the rebound stroke of the piston rod with a minimum of resistance.

The base or foot valve construction is provided with two valve means. The first valve means comprises a disc valve 104 fashioned with a central opening accommodating an enlarged portion 106 of a rivet 108. The valve disc 104 is fashioned with segmentally shaped open areas defined by inwardly extending tabs or lugs engaging the head 110 of the rivet 108 to form fluid passages. The foot valve body 100 is formed with two concentric circular ridges (not shown) at its upper surface forming seats for the disc valve 104.

Disposed between the disc 104 and the head 110 of the rivet 108 is a resilient member or star-shaped plate spring 112 of conventional construction, the resilient fingers of the plate spring engaging and biasing the disc valve 104 toward closed position in engagement with the circular seats on the valve body 100. The innermost of the circular seats on the valve body 100 may be provided with one or more small notches (not shown) to provide restricted bypass means to facilitate restricted flow of fluid out of the working cylinder during the compression stroke and prior to unseating of a "blow off" valve.

The second valve means or "blow off" valve 116 is slidable along the tenon 118 of the rivet 108 and seats against the lower surface of the base valve body 100. Passage means 120 in the form of notches are provided in the valve body 100 adjacent the enlarged portion 106 and tenon portion 118 of the rivet facilitating fluid flow along the rivet, the valve 116 controlling fluid flow through these passages. Secured upon the lower end of the tenon 118 is a washer or abutment member 122 which engages a valve spring 124, the latter normally holding the valve in closed position.

The coil spring 124 exerts substantial pressure on the valve 116 so that the valve 116 is opened only when the pressure of the fluid in the working cylinder becomes substantial because of the fluid displacement action of the rod during the compression stroke. The foot valve body 100 is formed at its periphery with circumferentially spaced notches or passages 126 to facilitate fluid flow into and out of the reserve chamber 24 as controlled by the valves 104 and 116 of the foot valve assembly.

By reason of the high piston velocities and high frequency reciprocations of the piston under certain conditions of vehicle operation, the liquid, such as oil is transferred at comparatively high velocities into and out of the reserve chamber 24. Such high velocities tend to set up turbulence and cavitation in the liquid in the reserve chamber 24, fostering emulsification of the oil. The presence of emulsified oil or foam within the working chamber 11 vitally impairs the successful operation of the shock absorber.

The shock absorber of the invention is inclusive of a simple, yet effective, baffle means for controlling movement of the liquid in the reserve chamber to eliminate or greatly reduce turbulence, cavitation and emulsification of the liquid in the reserve chamber. Compensation for piston rod displacement requires an equivalent volume of oil or other damping fluid to flow between the working chamber and the reserve chamber at every stroke. If the oil or damping fluid becomes aerated, a compressible mixture is carried into the working chamber on rebound strokes and this results in loss of control on succeeding compression strokes.

The arrangement of the invention includes a baffle arrangement for facilitating flow of liquid from one side of the baffle arrangement to the other in a spiral direction of low pitch so that even though the fluid must change its direction of flow suddenly, the flow through the baffle arrangement tends to hold the liquid column together and prevents it from "breaking up." Making the spiral path of transition of the liquid from one side of the baffle means to the other of a low pitch spiral and of comparatively short length, prevents gushing or splashing of the liquid and minimizes any tendency for the bodies of liquid at opposite sides of the baffle arrangement to become separated and thus practically eliminates aeration and foaming.

A form of baffle means of the invention comprises an annular member 130 configured with a cylindrical or sleeve portion 132 which is snugly fitted on the exterior surface of the working cylinder 10. The member 130 is fashioned with an outwardly extending circular flange 134 which is configured to form liquid deflecting or guide vanes 136. The guide vanes or deflectors 136 are arranged throughout the periphery of the flange 134 and are fashioned by severing the material radially of the flange at peripherally spaced regions and portions of the severed material struck up or distorted to form the vanes 136 of the shape illustrated in the drawings.

The upper terminal region 138 and lower terminal region 139 of each vane 136 is preferably disposed horizontally to provide transition surfaces to deflect the spirally moving fluid more nearly in horizontal directions at the openings 140 provided between adjacent vanes. An important factor bearing upon the successful operation of the baffle means is the angle indicated at A of the intermediate portion joining the terminal regions 138 and 139 of each vane as shown in FIGURE 3. It is found that the angle of a vane with a horizontal plane should be approximately twenty degrees for efficient operation.

While the angularity above specified for the vanes has been found to be very effective for satisfactory operation, it is to be understood that the angle A may be between ten degrees and thirty degrees and attain effective transition of liquid through the baffle means.

Through the baffle arrangement illustrated in the drawings and described herein, the oil or damping fluid may move rapidly through the openings 140 between adjacent vanes and be guided or deflected in a low spiral or helical path, and the direction of flow of liquid abruptly reversed without effecting separation of the liquid column at opposite sides of the baffle with a minimum of turbulence and without a jetting action.

It is believed that one of the factors promoting successful operation of the baffle means resides in the use of a comparatively large number of vanes 136 of short length so that the continuity of the body of liquid in the reserve chamber is maintained intact even though the shock absorber working cylinder and reservoir chamber are moving up and down, sometimes at very high frequencies and high velocities under the influence of road irregularities.

The operation of the shock absorber is as follows: During a compression stroke, pressure is exerted upon the liquid in the working chamber below the piston and some of the liquid moves through the passages 90 in the piston past the valve means 74 to the rod end of the working cylinder and some of the liquid moves through the foot valve construction through the fixed relief openings provided by the notches 104 as progressive portions of the piston rod 16 enter the working chamber 11 and displace the fluid therein. When a predetermined higher fluid pressure is developed against relief valve 116, it is opened as coil spring 124 is compressed.

When the relief valve 116 opens, the liquid flows into the reserve chamber 24 at high velocities and through the open regions 140 provided by the contour of the baffles 136. As the liquid moves through the baffle means at a relatively low velocity in a low pitched helical or spiral direction, turbulence is held at a minimum as the liquid column is not separated and aeration or foaming practically eliminated. On the rebound stroke, liquid moves from the upper or rod region of the working cylinder through the passages 92, past the valve 82 to the region below the piston.

As the region below the piston on a rebound stroke must receive more liquid than that displaced from the rod end of the working cylinder, liquid flows from the reserve chamber 24 past the valve 104 of the foot valve assembly into the working chamber 11. This necessitates an abrupt reverse direction of flow of oil through the baffle means but the liquid column in the reserve chamber remains intact because of the low pitch spiral or helical direction of flow transition of the liquid. The peripheral tips on the baffles 136 are arranged as close to the inner surface of the reserve chamber cylinder 22 as is practicable.

During operation of a vehicle on a roadway, irregularities in the roadway surface cause the body of the shock absorber, which includes the reservoir or reserve chamber, to be rapidly displaced vertically. Since the reservoir or reserve chamber 24 is only partly filled with liquid, a sudden "dropping" of the shock absorber body tends to separate the liquid column. The baffle means of the invention "supports" the fluid column as the shock absorber body moves rapidly downwardly and tends to prevent separation of the liquid of the column. The liquid column needs no support when the shock absorber body moves upwardly and the baffle means has sufficient "open" area provided by the passages 140 to permit rapid re-entry of the liquid. In the embodiment illustrated there are sixteen vanes or deflectors 136 used with a shock absorber wherein the internal diameter of the working cylinder 10 is approximately one inch and the piston rod 16 of a diameter of approximately one-half inch. Thus, the comparatively large number of low pitched vanes or deflectors 136 "support" the liquid column and yet do not appreciably resist flow of liquid from one side of the baffle means to the other.

It is apparent that, within the scope of the invention, modifications and different arrangements may be made other than as herein disclosed, and the present disclosure is illustrative merely, the invention comprehending all variations thereof.

I claim:

1. A hydraulic shock absorber of the direct-acting type including, in combination, a first cylinder defining a working chamber, a second cylinder surrounding and spaced from the first cylinder and defining therewith a liquid reserve chamber, closure means for the adjacent ends of the working and reserve cylinders, a piston reciprocable in the working cylinder, a rod connected with the piston and extending through an opening in the closure means at one end of the working cylinder, said piston having passages therein, valve means carried by the piston for controlling flow of liquid from one side of the piston to the other in the working cylinder, a foot valve assembly adjacent the opposite end closure, said foot valve assembly including a member having passages accommodating flow of liquid between the working and reserve chambers, valve means associated with said member for controlling flow of liquid through the passages, baffle means disposed in said reserve chamber, said baffle means including an annular member secured to one of said cylinders, said member having a plurality of circumferentially arranged vanes in the reserve chamber, each of said vanes being arranged at an acute angle with respect to a plane normal to the axis of the working cylinder and defining open areas facilitating flow of liquid along said vanes in a generally spiral direction whereby to maintain the liquid at each side of the vanes in a substantially integrated state by the liquid adjacent the vanes of the baffle means.

2. A hydraulic shock absorber of the direct-acting type including, in combination, a first cylinder defining a working chamber, a second cylinder surrounding and spaced from the first cylinder and defining therewith a liquid reserve chamber, closure means for each of the adjacent ends of the working and reserve cylinders, a piston assembly reciprocable in the working cylinder, a rod connected with the piston and extending through an opening in a closure at one end of the working cylinder, said piston having passages therein, valve means for controlling flow of liquid from one side of the piston to the other, a foot valve arrangement adjacent the opposite end closure, said foot valve arrangement including a body having passages to accommodate flow of liquid between the working and reserve chambers, valve means associated with said body for controlling flow of liquid through said passages, baffle means disposed in said reserve chamber at a region spaced from the foot valve arrangement, said baffle means including a member having a cylindrical sleeve portion snugly fitting a surface of one of said cylinders and secured thereto, a laterally extending portion integral with the sleeve portion, said laterally extending portion being shaped to provide a plurality of circumferentially spaced vanes extending across the reserve chamber, said vanes being arranged at an acute angle with respect to a plane normal to the axis of the working cylinder, the adjacent edges of adjacent vanes being in substantially vertical alignment defining passages facilitating flow of liquid along said vanes in a generally spiral direction whereby to maintain the body of liquid at each side of the vanes connected by the liquid adjacent the vanes of the baffle means.

3. A hydraulic shock absorber of the direct-acting type including, in combination, a first cylinder defining a working chamber, a second cylinder surrounding and spaced from the first cylinder and defining therewith a liquid reserve chamber, closure means for each of the adjacent ends of the working and reserve cylinders, a piston reciprocable in the working cylinder, a rod connected with the piston and extending through an opening in a closure at one end of the working cylinder, said piston having passages therein, valve means for controlling flow of liquid from one side of the piston to the other, a foot valve arrangement adjacent the opposite end closure, said foot valve arrangement including a body having passages to accommodate flow of liquid between the working and reserve chambers, valve means associated with said body for controlling flow of liquid through said passages, baffle means disposed in said reserve chamber, said baffle means including an annular member secured to one of said cylinders, said member having a plurality of vanes extending across the reserve chamber, said vanes being arranged at an acute angle with respect to a plane normal to the axis of the working cylinder, the adjacent edges of adjacent vanes defining open areas facilitating flow of liquid along said vanes whereby to maintain the body of liquid at each side of the vanes connected by the liquid adjacent the vanes of the baffle means.

4. A hydraulic shock absorber of the direct-acting type including, in combination, a first cylinder defining a working chamber, a second cylinder surrounding and spaced from the first cylinder and defining therewith a liquid reserve chamber, closure means for each of the adjacent ends of the working and reserve cylinders, a piston assembly reciprocable in the working cylinder, a rod connected with the piston assembly and extending through an opening in a closure at one end of the working cylinder, said piston having passages in the piston, valve means for controlling flow of liquid from one side of the piston to the other, a foot valve assembly adjacent the opposite end closure, said foot valve assembly including a body having passages to accommodate flow of liquid between the working and reserve chambers, valve means associated with said body for controlling flow of liquid through the passage in said body, baffle means disposed in said reserve chamber, said baffle means including a member formed with a cylindrical sleeve portion snugly fitting the exterior surface of the working cylinder and secured thereto, a laterally extending portion integral with the sleeve portion, said laterally extending portion being shaped to provide a plurality of circumferentially arranged vanes, said vanes being arranged at an acute angle with respect to a plane normal to the axis of the working cylinder, the adjacent edges of adjacent vanes being in substantially vertical alignment defining open areas facilitating flow of liquid whereby to maintain the body of liquid at each side of the vanes in integrated condition through the regions of the liquid adjacent the vanes of the baffle means.

5. Baffle means for a reserve chamber of a double-acting shock absorber having a working chamber and a reserve chamber defined by concentrically arranged cylinders, said baffle means comprising an annular rigid member having a portion fitting one of the surfaces of a cylinder defining the reserve chamber, said member having radially disposed vanes extending across the reserve chamber, said vanes being angularly arranged with respect to a plane normal to the axis of the reserve chamber providing for flow of liquid along the vanes, the edge regions of adjacent vanes being spaced to provide open areas whereby the liquid moving through the open areas establishes continuity with liquid at opposite sides of the baffle under high velocity movement of the liquid through the open areas.

6. Baffle means for use in a reserve chamber of a double-acting shock absorber having a working chamber and a reserve chamber defined by concentrically arranged cylinders, said baffle means comprising an annular rigid member having a sleeve portion adapted to fit onto the exterior of the working cylinder, said member having radially extending circumferentially disposed vanes, said vanes being of comparatively short length and angularly arranged with respect to a plane normal to the axis of the sleeve portion to provide passages for flow of liquid from one side of the baffle means to the other.

7. Baffle means for use in a reserve chamber of a double-acting shock absorber having a working chamber and a reserve chamber defined by concentrically arranged cylinders, said baffle means comprising an annular rigid member having a sleeve portion adapted to fit onto the exterior of the working cylinder, said member having radially extending circumferentially disposed vanes, said vanes being of comparatively short length and angularly arranged with respect to a plane normal to the axis of the sleeve portion to provide passages for flow of liquid, the edge regions of adjacent vanes being in substantial vertical alignment.

8. Baffle means for use in a reserve chamber of a double-acting shock absorber having a working chamber and a reserve chamber defined by concentrically arranged cylinders, said baffle means comprising an annular rigid member having a sleeve portion adapted to fit onto the exterior of the working cylinder, said member having radially extending circumferentially disposed vanes, said vanes being of comparatively short length and angularly arranged with respect to a plane normal to the axis of the sleeve portions to provide open areas for flow of liquid, the edge regions of adjacent vanes being in substantial vertical alignment whereby the open areas establish continuity with liquid at opposite sides of the baffle through the liquid moving through the open areas defined by the vanes, said vanes being shaped to impart a direction of flow to the liquid moving through the open areas in helical paths of low pitch.

9. Baffle means for use in a reserve chamber of a double-acting shock absorber having a working chamber and a reserve chamber defined by concentrically arranged cylinders, said baffle means comprising a sleeve portion adapted to fit onto the working cylinder, a plurality of radially extending circumferentially arranged rigid vanes integral with the sleeve portion, said vanes being of comparatively short length and angularly arranged with respect to a plane normal to the axis of the sleeve portion, angular portions of the vanes being configurated whereby the same are joined with the sleeve portion at a region in the plane of the lower edge regions of the vanes, the adjacent edge regions of adjacent vanes being substantially parallel forming open areas through which liquid flows from one side of the baffle means to the other in a spiral path under the influence of the angularity of the said vanes.

10. Baffle means for use in a reserve chamber of a double-acting shock absorber having a working chamber and a reserve chamber defined by concentrically arranged cylinders, said baffle means comprising a member having a sleeve portion adapted to fit onto the exterior of the working cylinder, a plurality of radially extending circumferentially arranged vanes integrally joined with the sleeve portion, said vanes being of comparatively short length and angularly arranged with respect to the plane normal to the axis of the sleeve portion, the angularity of said vanes being between ten degrees and thirty degrees, the angular portions of the vanes being configurated whereby the same are joined with the sleeve portion at a region in a plane of the lower edge regions of the vanes, the adjacent upper and lower edge regions of adjacent vanes being in substantial vertical alignment forming passages through which liquid may flow from one side of the baffle means to the other in a spiral path under the influence of the angularity of the said vanes.

11. Baffle means for use in a reserve chamber of a double-acting shock absorber having a working chamber and a reserve chamber defined by concentrically arranged cylindrical members, said baffle means comprising a member having a sleeve portion adapted to fit onto the exterior of the working cylinder, said member having an outwardly extending flange portion, said flange portion being severed at circumferentially spaced regions providing a plurality of deflectors, said deflectors being contoured with portions arranged at an acute angle with respect to the plane of the flange portion, the adjacent edge regions of adjacent deflectors being spaced vertically providing passages for the flow of liquid, said deflectors guiding the liquid in a spiral path in its flow from one side of the baffle means to the other.

References Cited by the Examiner

UNITED STATES PATENTS

| | | | |
|---|---|---|---|
| 1,729,390 | 9/1929 | Kamrath | 55—457 X |
| 2,508,528 | 5/1950 | McPherson | 55—178 |
| 2,800,196 | 7/1957 | Avant | 55—456 |
| 2,808,131 | 10/1957 | Heckethorn | 188—100 |
| 2,869,677 | 1/1959 | Yellott et al. | 55—457 X |
| 3,078,965 | 2/1963 | Bourcier de Carbon et al. | 188—100 X |

FOREIGN PATENTS 135,937   1/1957   Australia.

FERGUS S. MIDDLETON, *Primary Examiner.*

EUGENE G. BOTZ, MILTON BUCHLER, *Examiners.*